United States Patent [19]
Berry et al.

[11] Patent Number: 6,147,699
[45] Date of Patent: Nov. 14, 2000

[54] LOW ELECTROMAGNETIC EMISSIONS AND IMPROVED SIGNAL QUALITY VIDEO DRIVE ARCHITECTURE FOR LASER PRINTERS

[75] Inventors: John Bruce Berry; Keith Bryan Hardin; John Parker Richey, all of Lexington, Ky.

[73] Assignee: Lexmark International, Inc., Lexington, Ky.

[21] Appl. No.: 09/189,777

[22] Filed: Nov. 10, 1998

[51] Int. Cl.[7] ............................................. B41J 2/47
[52] U.S. Cl. ...................... 347/255; 395/114; 395/888; 358/261.1; 382/245
[58] Field of Search ......................... 347/132, 236, 347/237, 247, 239, 255; 345/3; 382/166, 191, 232, 234, 245; 358/261.1, 463; 395/114, 106, 888; 329/318; 375/254

[56] References Cited

U.S. PATENT DOCUMENTS

| | | | |
|---|---|---|---|
| 4,725,967 | 2/1988 | Aibe et al. | 358/1.5 |
| 4,972,210 | 11/1990 | Woo | 347/237 |
| 5,440,684 | 8/1995 | Tack et al. | 345/511 |
| 5,757,338 | 5/1998 | Bassetti et al. | 345/3 |
| 5,761,341 | 6/1998 | Go | 382/232 |

*Primary Examiner*—N. Le
*Assistant Examiner*—Hai C. Pham
*Attorney, Agent, or Firm*—Luedeka, Neely & Graham, P.C.; D. Brent Lambert

[57] ABSTRACT

An electrophotographic image forming apparatus transfers image information relating to an image to be formed on a medium, while maintaining desired low levels of electromagnetic emissions. The apparatus includes an image processor that generates low-frequency image information signals containing the image information. A low-frequency interface is connected to the image processor for transferring the low-frequency image information signals. A control circuit, connected to the low-frequency interface, receives the low-frequency image information signals generated by the image processor. The control circuit operates on the low-frequency image information signals to form a high-frequency image information signal therefrom, where the high-frequency image information signal contains the image information. The apparatus also includes a high-frequency interface connected to the printhead control circuit for transferring the high-frequency image information signal. An image formation device, connected to the high-frequency interface, forms an image on the medium. The image formation device forms the image based on the image information contained within the high-frequency image information signal.

25 Claims, 5 Drawing Sheets

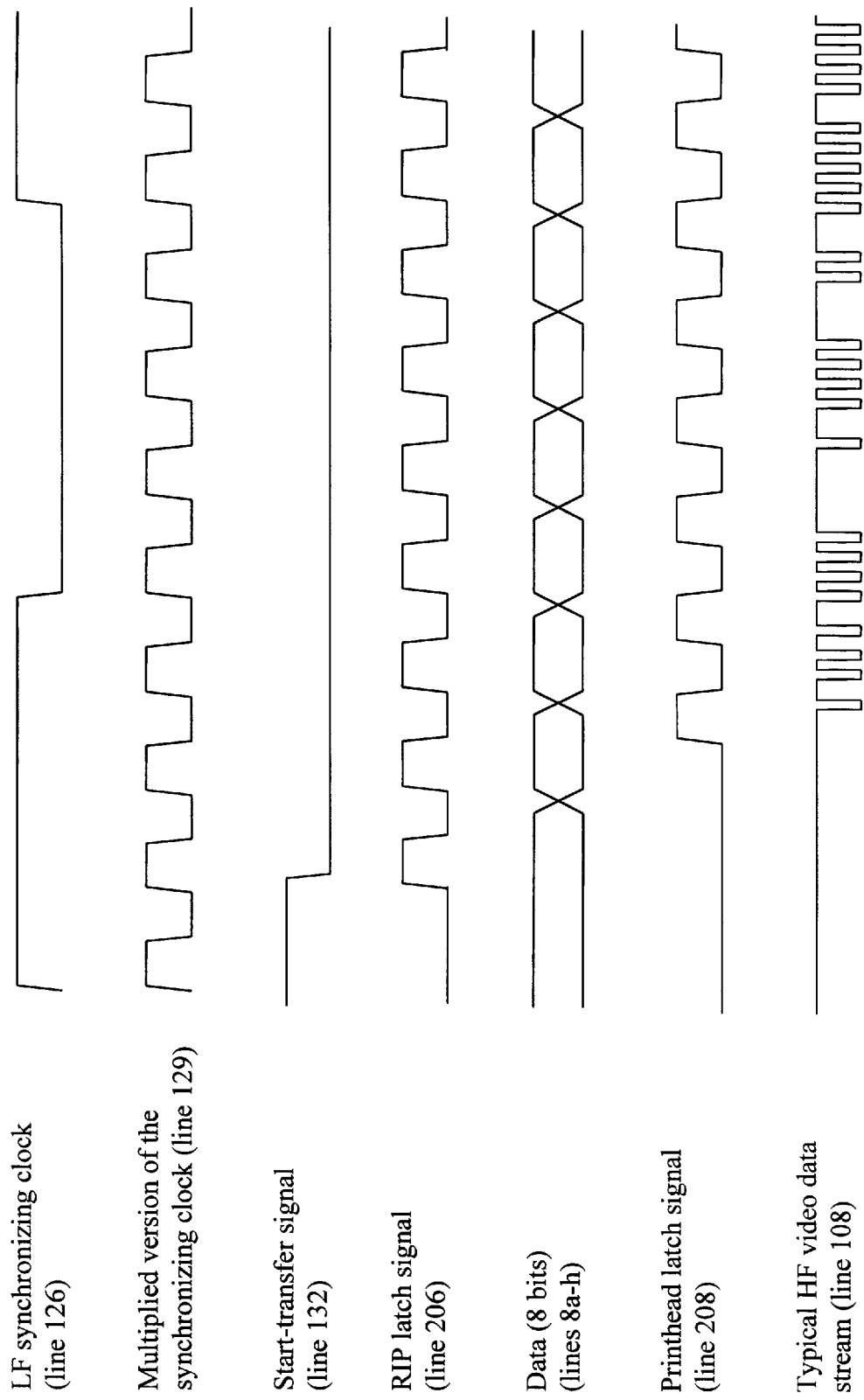

LOW ELECTROMAGNETIC EMISSIONS AND IMPROVED SIGNAL QUALITY VIDEO DRIVE ARCHITECTURE FOR LASER PRINTERS

FIELD OF THE INVENTION

The present invention is generally directed to image-forming devices, and is more particularly directed to a video drive architecture that decreases electromagnetic emissions and improves video signal quality in electrophotographic image-forming devices.

BACKGROUND OF THE INVENTION

Laser-based electrophotographic image-forming devices typically form images by scanning a laser across the surface of a photoconducting drum. Typically, a video signal causes a laser diode to pulse on and off as it's beam scans across the surface of the drum. Those portions of the drum surface that are struck by the laser beam undergo a physical change that enables the drum to pick up and then place toner on a sheet of paper.

Typically, the video signal is produced by an integrated circuit (IC) located on a raster image processor card. The video signal is transmitted over an electrical cable to an IC on an engine card. Usually, the video signal is then redriven over a cable from the engine card IC to a laser diode control card.

It is useful to think of printed images formed by electrophotographic image-forming devices as being constructed of printer elements, or pels. A pel is sometimes referred to as a dot, and the resolution of a printer is often characterized by the number of dots that it can print within a given linear distance, such as 600 dots per inch (DPI).

As shown in FIG. 1, a laser typically forms a dot by pulsing on and then off again for a given length of time within the pel. Often, a fifty percent duty cycle is used, such as illustrated in FIG. 1, meaning that the laser is off for approximately half of the total scan width of the pel, and on for approximately half of the total scan width of the pel. More specifically, the laser may be off as it scans across the first quarter of the pel, then on as it scans across the middle half of the pel, and then off again as it scans across the final quarter of the pel.

Among the general goals in the design of electrophotographic image-forming devices are increased speed and increased resolution. Increasing speed means decreasing the amount of time required to form an image on a page, or in other words, increasing the scan speed of the laser. Increasing the resolution of the image typically involves decreasing the size of the pels, or in other words, putting more pels within a given linear distance. Achieving either of these goals results in the laser operating at an increased frequency. For example, if the scan speed of the laser is increased, then it forms more pels per unit time. Since the video signal typically pulses the laser on and off for each pel as described above, the laser is pulsing on and off at a faster rate.

Similarly, if the resolution increases, then more pels are formed per unit scan distance of the laser. For example, if the 600 DPI resolution shown in FIG. 1 were increased to 1200 DPI, the width of each pel would decrease from $\frac{1}{600}$ of an inch to $\frac{1}{1200}$ of an inch. Assuming that the laser scan speed is not reduced, this increase in resolution also means that the laser is pulsed on and off at a faster rate.

The level of radiated electromagnetic interference (EMI) produced by a electrophotographic image-forming device tends to be related to the frequency at which the laser operates. Typically, increasing the operating frequency of the laser tends to increase the radiated EMI, and any reduction in the operating frequency tends to decrease the EMI. Radiated EMI from video data transmissions is also increased by each redrive of the video signal. The problem is magnified by the fact that often times the video signal travels from one card to another over long cables.

Governments regulate the amount of radiated EMI that a device such as a printer may emit. Thus, the level of radiated EMI produced by a printer is of great concern to printer manufacturers. In efforts to reduce radiated EMI, some manufacturers have reduced the length of the cable carrying the video signal, or reduced the voltage of the laser control signal to the laser, which tends to reduce the current. Other techniques include using coaxial cable or adding toroids to the cable. These methods tend to reduce the antenna effects of the cable, but they also tend to be expensive. Consequently, such methods are typically used as a last resort to save the product schedule.

Additionally, the quality of the video signal that drives the laser diode becomes more difficult to maintain as the video signal is driven over cables at high pel frequencies. The video signal quality can be significantly degraded by impedance mismatches between the conductors in the video cables and traces on the cards to which the conductors are connected. The effects of these impedance mismatches become more pronounced at higher video frequencies. As a result, the printed image quality tends to degrade as the frequency of the video signal increases.

What is needed, therefore, is an apparatus that reduces radiated EMI generated by a printer and maintains printed image quality, without significantly increasing the production cost or reducing the speed or apparent resolution of the printer.

SUMMARY OF THE INVENTION

The foregoing and other needs are met by an electrophotographic image forming apparatus that transfers image information relating to an image to be formed on a medium, while maintaining desired low levels of electromagnetic emissions. The apparatus includes an image processor that generates low-frequency image information signals containing the image information. Low-frequency interface means are connected to the image processor for transferring the low-frequency image information signals. A control circuit, connected to the low-frequency interface means, receives the low-frequency image information signals generated by the image processor. The control circuit operates on the low-frequency image information signals to form a high-frequency image information signal therefrom, where the high-frequency image information signal contains the image information. The apparatus also includes high-frequency interface means connected to the printhead control circuit for transferring the high-frequency image information signal. An image formation device, connected to the high-frequency interface means, forms an image on the medium. The image formation device forms the image based on the image information contained within the high-frequency image information signal.

Thus, by transferring the image information between the image processor and the printhead control circuit using several low-frequency signals, the invention reduces the radiated EMI that is inherent in the use of a single high-frequency signal. Further, by transferring the image information using several low-frequency signals, it is generally technically easier to provide a high quality image as compared to using a single high-frequency signal.

Further, the invention transfers the image information using the low-frequency signals at a rate which is as least as great as the rate that would be attained using a single high-frequency signal. Consequently, the invention does not compromise image formation speed or apparent image resolution while providing the benefits of reduced EMI and equal or improved image quality.

In another aspect, the invention provides a video drive circuit for transferring image information in an electrophotographic image forming device, where the image information relates to an image to be formed on a medium. The circuit transfers the image information using a plurality of low-frequency video signals at a rate no less than is attainable using a single high-frequency video signal.

In yet another aspect, the inventions allows for multiple high frequency image information signals to be produced by the high-frequency interface means on the print head card. Printers with multiple laser diodes would require multiple high frequency image information signals. Examples of printers with multiple diodes include color laser printers and monochrome printers that allow for multiple scan lines to be applied to the photo conductor drum simultaneously.

The video drive circuit, which has desired low levels of electromagnetic emissions, includes an image processor for generating the low-frequency video signals that carry the image information. The low-frequency video signals are lower in frequency than a high-frequency video signal, where the frequency of the high-frequency video signal is the frequency at which image picture elements are formed on the medium. The image processor generates an integer number of low-frequency video signals, where the frequency of each is the quotient of the frequency of the high-frequency video signal divided by an integer value representing the integer number of low-frequency video signals.

The video drive circuit also has a parallel interface cable connected to the image processor for transferring the low-frequency video signals. The parallel interface cable has at least as many conductors as there are low-frequency video signals, where each of the low-frequency video signals is transferred across a conductor of the parallel interface cable.

The video drive circuit includes a laser printhead having a printhead control circuit. The printhead control circuit is connected to the parallel interface cable for receiving the low-frequency video signals generated by the raster image processor. The printhead control circuit operates on the low-frequency video signals to form at least one high-frequency video signal therefrom, where the high-frequency video signal contains the image information. The laser printhead includes high-frequency interface means connected to the printhead control circuit for transferring the high-frequency video signal. The laser printhead also has a laser diode and analog laser diode driver connected to the high-frequency interface means. The laser diode forms an image on the print medium based on the image information contained within the high-frequency video signal.

In yet another aspect, the invention provides a laser printer, having desired low levels of electromagnetic emissions, for forming images on a print medium. The laser printer includes a raster image processor that generates a plurality of low-frequency video signals. The low-frequency video signals jointly carry image information relating to an image to be formed on the print medium. The laser printer also has low-frequency interface means connected to the raster image processor for transferring the low-frequency video signals. The laser printer includes a printhead control circuit connected to the low-frequency interface means. The printhead control circuit receives the low-frequency video signals generated by the raster image processor, and operates on them to form at least one high-frequency video signal that carries the image information. The laser printer further includes high-frequency interface means connected to the printhead control circuit for transferring the high-frequency video signal. Connected to the high-frequency interface means is a laser device that causes a toner material to transfer an image to the print medium. The transferred image is based on the image information contained within the high-frequency video signal.

In a further aspect, the high-frequency interface means include means to synchronize and align the start of scan lines by utilizing a horizontal synchronization sensor called H-Sync. The H-Sync sensor is activated when the laser is activated and sweeps the sensor to indicate a new start of scan location.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows:

FIG. 5 is a waveform timing diagram of typical clock and data signals generated by the video drive circuit.

DETAILED DESCRIPTION OF THE INVENTION

Figure 2:
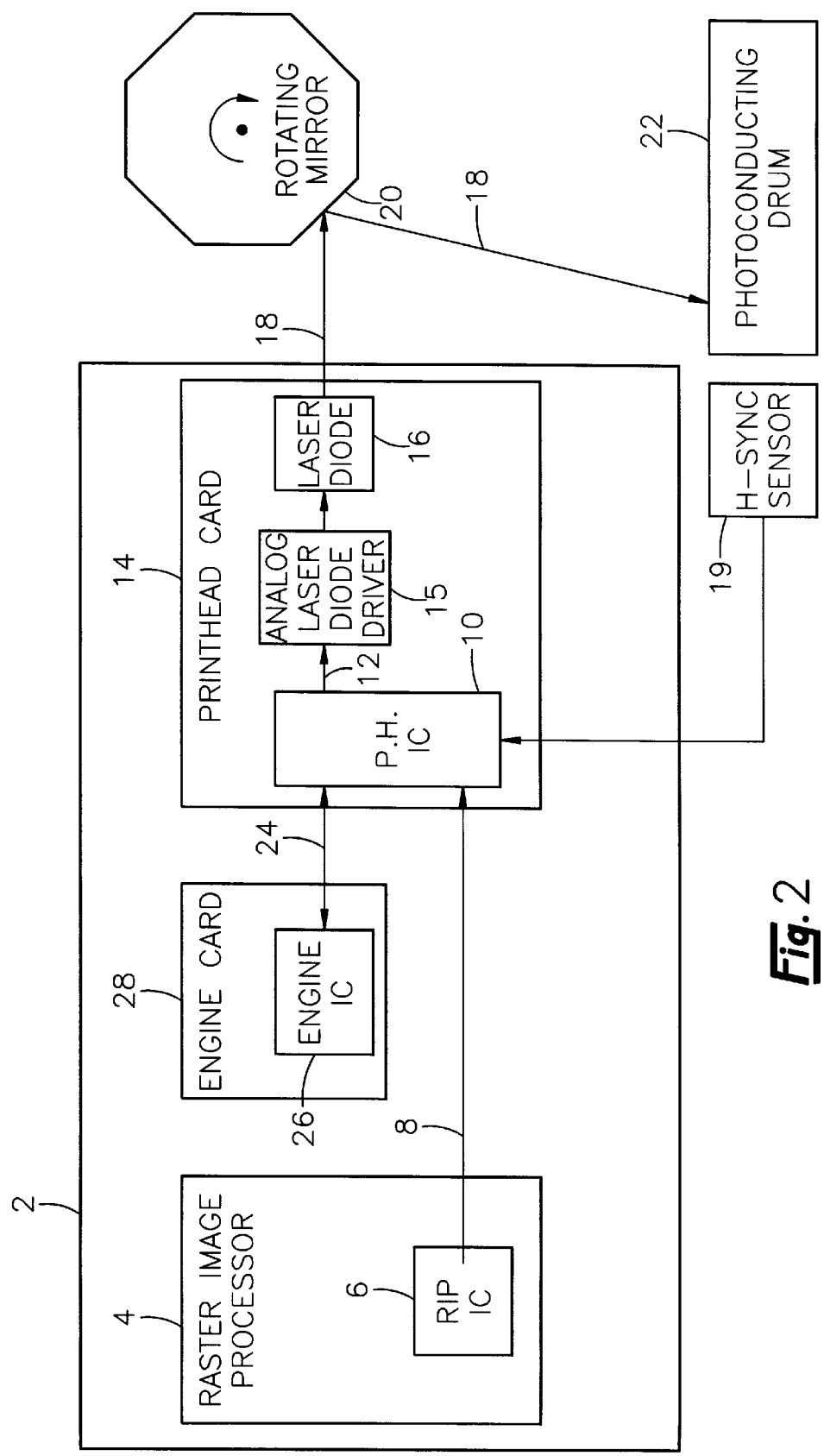
FIG. 2 is a functional block diagram of an enhanced video signal architecture.

Shown in FIG. 2 is a functional block diagram of an enhanced video signal architecture 2 for transferring image information. Such an architecture is well suited for implementation in many types of electrophotographic image forming devices, including laser printers, copying machines, fax machines, and other devices which combine the functions of these machines. The following description of the invention first provides a general overview of the architecture 2 and its function, and then provides a more detailed disclosure of a preferred embodiment.

Figure 1:
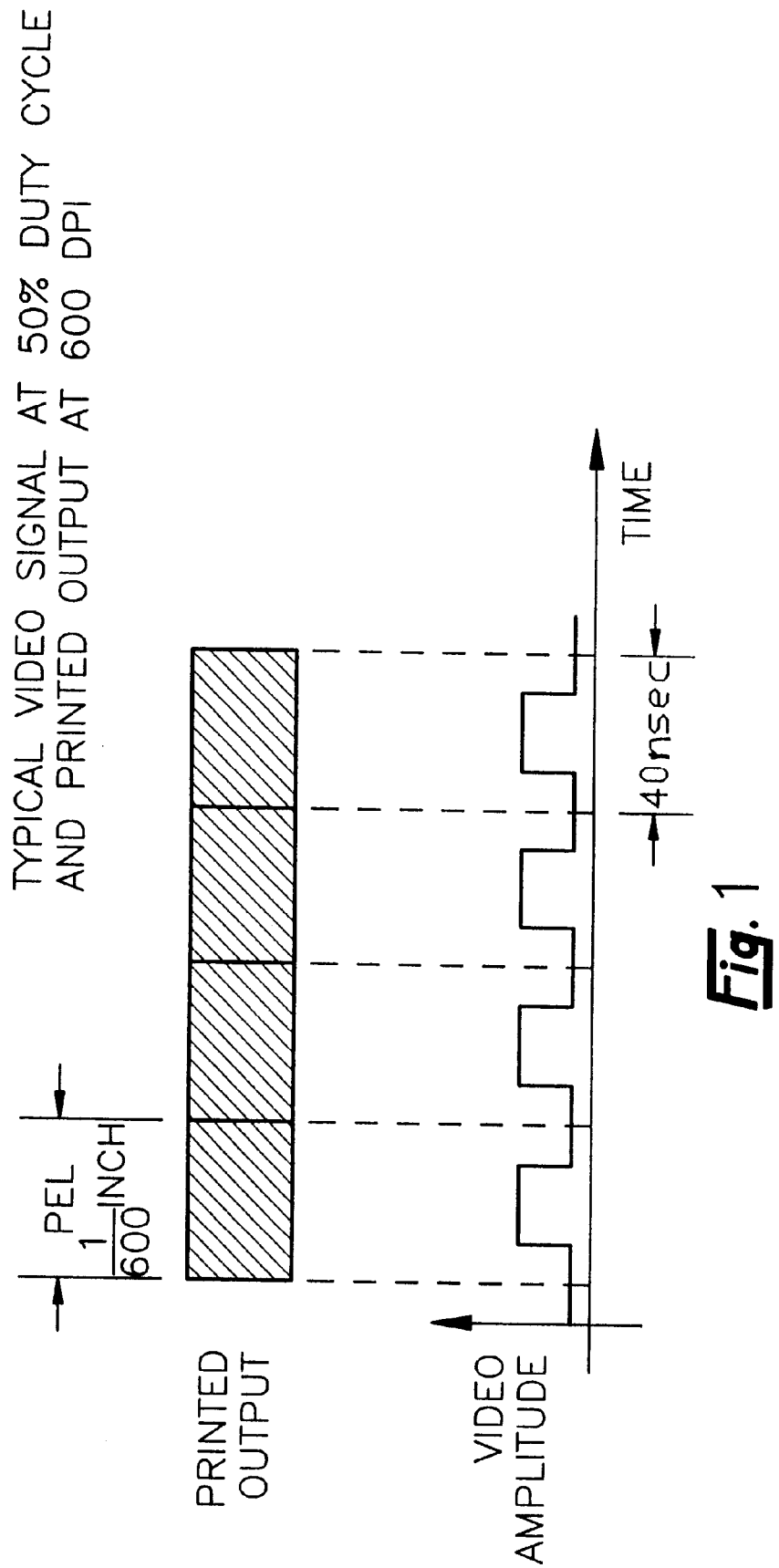
FIG. 1 is a waveform timing diagram of a typical video signal for driving a laser diode at 600 DPI and 25 MHz.

An image processor 4, such as a raster image processor (RIP), generates a high-frequency (HF) image information signal, hereinafter referred to as an HF video signal. The HF video signal carries information indicating the location and the size (or darkness level) of each pel that makes up an image to be printed. For example, the RIP 4 may generate this HF video signal based on a bit map of the image. For convenience in describing the operation of the RIP 4, it will be assumed that the resolution of the image to be printed is 600 DPI and that the frequency of the HF video signal is 25 MHz, such as the signal shown in FIG. 1.

One skilled in the art will appreciate that the RIP 4 could also send multiple bits to define various characteristics of each single pel.

The RIP 4 includes a RIP integrated circuit (IC) 6. The RIP IC 6 generates several low-frequency (LF) image information signals (hereinafter referred to as LF video signals) that, in combination, carry the same image information as contained in the HF video signal. In a preferred embodiment, the frequency of each LF video signal is determined according to $$f_{LF} = \frac{f_{HF}}{n_{LF}},$$

where $\theta_{LF}$ is the frequency of each LF video signal, $\theta_{HF}$ is the frequency of the HF video signal, and $n_{LF}$ is the number of LF video signals. For example, when $\theta_{HF}$ is 25 MHz and $n_{LF}$ is eight, $\theta_{LF}$ is 3.125 MHz.

With continued reference to FIG. 2, one end of a low-frequency parallel interface cable 8 is connected to the RIP IC 6. The interface cable 8 includes a conductor for each of the LF video signals. Thus, each of the LF video signals is carried on a separate conductor of the interface cable 8. The other end of the interface cable 8 is connected to a control circuit, such as a printhead IC 10 on a printhead card 14.

The printhead IC 10 receives the LF video signals via the cable 8, and recombines them to form a reconstructed HF video signal. The operation of the printhead IC 10 in recombining the LF video signals is described in greater detail below. An HF interface cable 12, connected to the printhead IC 10, carries the reconstructed HF video signal which has a waveform such as that illustrated in FIG. 1. The reconstructed HF video signal on the cable 12 drives an analog laser diode driver 15. The analog laser diode driver 15 drives an image forming device, such as a laser diode 16. In response to the amplitude variations of the HF video signal, the laser diode 16 pulses on and off.

The pulsing of the laser diode 16 creates a pulsed laser beam 18 that impinges upon a surface of a rotating octagonal mirror 20. As the mirror 20 rotates, the portion of the beam 18 reflected from the mirror scans across a photoconducting drum 22. The drum 22 develops an electrical charge at each location that the laser beam 18 struck. When the drum 22 is then exposed to toner powder, the toner powder adheres to the charged areas on the drum 22. When the drum 22 contacts a medium, such as paper, the toner powder adhering to the drum 22 transfers to the medium, thus forming an image on the medium.

In addition to the LF video signals, the printhead IC 10 also receives control signals. A control signal interface cable 24 carries the control signals from an engine IC 26 on an engine card 28 to the printhead IC 10. The engine IC 26 generates the control signals that include setup information and power adjustment information for the printhead card 14. These signals also control the feeding of paper, fusing of the toner powder, operation of the mirror motor, and sensing of the mirror position.

The control signals carried on the cable 24 also include a signal that causes the laser diode 16 to turn on as the laser beam 18 scans over a horizontal synchronization (H-Sync) sensor 19. When the beam 18 impinges on the sensor 19, it generates an H-SYNC signal. The H-SYNC signal is a timing reference signal that the printhead IC 10 uses to precisely synchronize the scanning of the laser beam 18 across the surface of the drum 22 with the pulsing of the laser diode 16 by the HF video signal.

One of the advantages provided by the architecture 2 shown in FIG. 2 is that no high-frequency video signal passes between the RIP card 4 and the printhead card 14. Since all of the signals carried over the LF interface cable 8 are relatively low-frequency signals, the previously described radiated EMI and signal quality degradation problems are alleviated. The only cable carrying a high-frequency signal is the HF interface cable 12. However, since the printhead IC 10 is located as closely as physically possible to the laser diode 16, the signal path length of the HF interface cable 12 is minimized. This reduces the antenna effects of the cable 12, which consequently reduces radiated EMI.

Further, the disclosed video architecture 2 does not compromise printing speed or image resolution in attaining these benefits. The multiple LF video signals carry the same amount of information at the same rate as the single HF video signal. Thus, the disclosed architecture 2 significantly reduces the frequency of the signals transferred between the RIP card 4 and the printhead card 14, without reducing the number of pels that are transferred to the print medium in a given time.

In an alternative embodiment, the frequency of each LF video signal transferred over the LF interface cable 8 is further reduced by compressing the image information. Before the HF video signal is converted into multiple LF video signals, the image information carried by the HF video signal is compressed, such as by a run length encoding technique. Since compression reduces the amount of data to be transferred without reducing the amount of information, the same amount of information is transferred in a given time, but at a reduced data rate. A reduced data rate results in a reduction in frequency of the HF video signal. Since the frequency of each LF video signal is proportional to the frequency of the HF video signal, the frequency of each LF video signal is consequently reduced.

In yet another embodiment, multiple voltage levels are used to encode the image information in each LF video signal. For example, instead of encoding the image data with a binary code that uses two voltage states (on/off), four voltage states could be used. Increasing the number of voltage states used to encode the data reduces the frequency of transitions on the video cables and reduces the number of video lines needed to send the same amount of information.

As mentioned previously, in yet another embodiment, multiple data bits can be used to represent a single pel.

Figure 3:
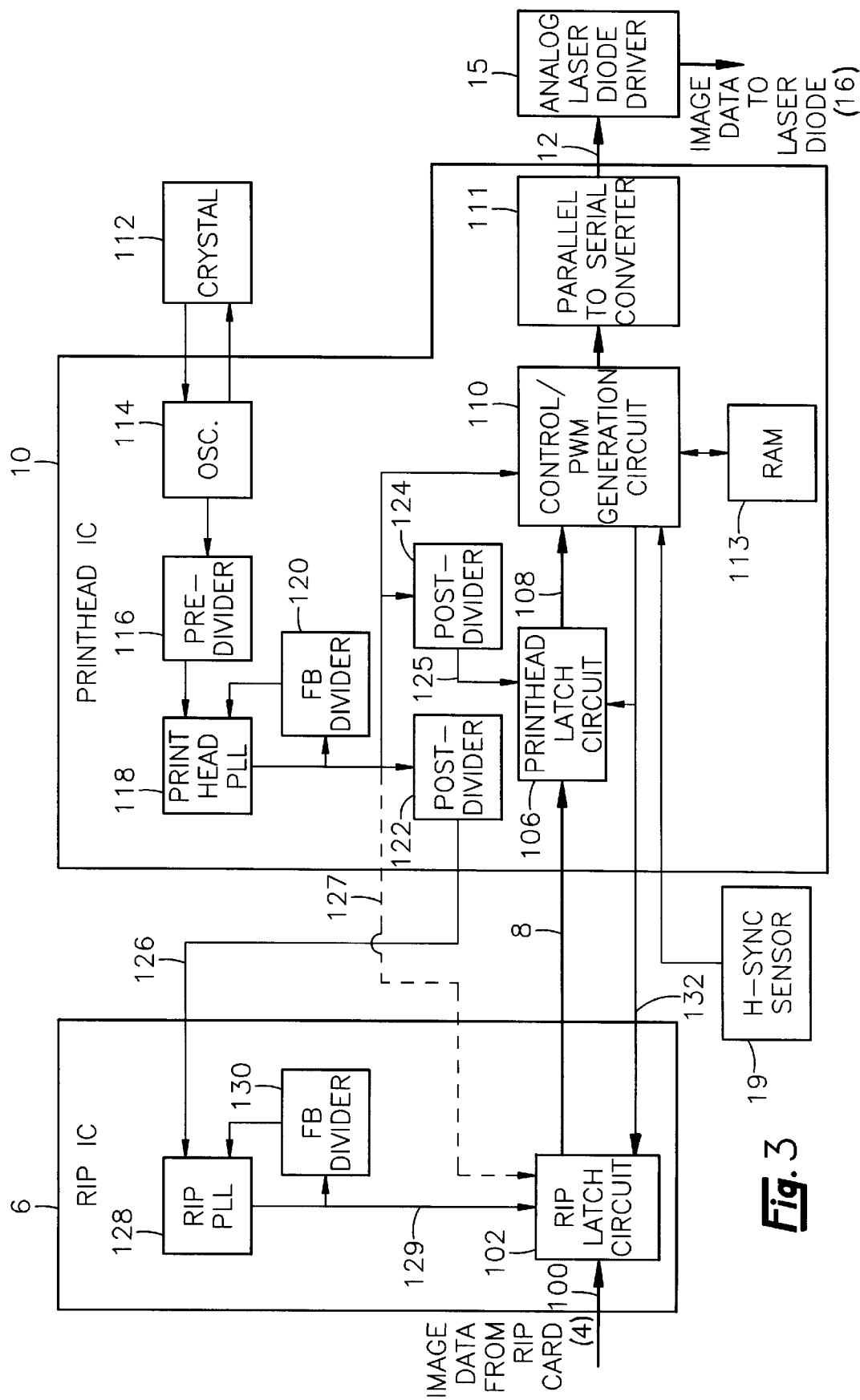
FIG. 3 is a functional block diagram of a preferred embodiment of a video drive circuit.

Shown in FIG. 3 is a functional block diagram of a preferred embodiment of the video drive circuit, including the RIP IC 6 and the printhead IC 10. The HF video signal, generated on the RIP card 4, is sent over line 100 to a RIP latch circuit 102. As discussed previously, the HF video signal is composed of image data indicating the location and the size (or darkness level) of each pel that makes up an image to be printed. The RIP latch circuit 102 shifts out the image data from the HF video signal into several LF video signals. In the preferred embodiment, there are eight LF video signals.

The eight-conductor LF video data cable 8 carries the eight LF video signals from the RIP latch circuit 102 on the RIP IC 6 to a printhead latch circuit 106 on the printhead IC 10. The printhead latch circuit 106 samples the eight LF video signals and recombines the sampled image data to generate a reconstructed HF video signal on a line 108. Thus, the HF video signal on the line 108 consists of the latched LF video signals. The line 108 carries the reconstructed HF video signal from the printhead latch circuit 106 to a control/pulse-width modulation (PWM) generation circuit 110 that incorporates random access memory (RAM) 113.

The image data that comprises the reconstructed HF video signal merely indicates whether a particular pel within an image is on or off. The control/PWM generation circuit 110 determines the width and placement of the pulse for each pel that is on. Thus the control/PWM generation circuit 110 controls the gray scale level of each pel, and controls the image quality using technologies such as Print Quality Enhancement Technology (PQET) and Image Enhancement Technology (IET).

With continued reference to FIG. 3, an oscillator circuit 114 generates a first clock signal using a crystal 112 to establish the signal's frequency. In a preferred embodiment, a pre-divider 116 reduces the frequency of the first clock signal to produce a second clock signal that is passed to a printhead phase-lock-loop (PLL)118. The printhead PLL 118, in conjunction with a feedback (FB) divider 120, generates a third clock signal having the desired frequency used by the control/PWM generation circuit 110.

Preferably, a post-divider 122 reduces the frequency of the third clock signal to generate a free-running low-frequency synchronizing clock signal on the line 126. The line 126 transfers the synchronizing clock signal to a RIP PLL 128 on the RIP IC 6. To properly synchronize data transfer, the RIP PLL 128 is designed to be phase synchronized with the printhead PLL 118. The RIP PLL 128, in conjunction with an FB divider 130, generates a continuously-running multiplied version of the synchronizing clock signal. The frequency of the multiplied version of the synchronizing clock signal is the same as the frequency of each of the LF video signals carried on cable 8. As explained in greater detail below, the RIP latch circuit 102 uses the multiplied version of the synchronizing clock signal to shift out the image data from the HF video signal to produce the eight LF video data signals. The data transfer from the RIP latch circuit 102 begins when the RIP latch circuit 102 receives a start-transfer signal over the line 132 from the control/PWM generation circuit 110.

In an alternative embodiment, the post-diver 122 does not reduce the frequency of the third clock signal. In this embodiment, the third clock signal is fed directly to the RIP latch circuit 102 on a line 127 (dashed in FIG. 3). In this alternative embodiment, there is no need for the RIP PLL 128.

To properly recombine the image data in the printhead IC 10, the printhead latch circuit 106 samples the data from the eight LF video signals at the same frequency as that used to shift out the data. A post-divider 124 supplies a sampling clock signal on the line 125 which is fed to the printhead latch circuit 106. The post-divider 124 generates the sampling clock signal by receiving the third clock signal and reducing its frequency to equal that of the multiplied version of the synchronizing clock signal.

To illustrate, suppose that the 600 dpi pel frequency of the HF video signal on line 100 is 25 MHz. Then the 600 dpi pel frequency of each video signal carried on line 8 is $$\frac{25 \text{MHz}}{8} = 3.125 \text{MHz}.$$

Thus, the multiplied version of the synchronizing clock signal (line 129) and the sampling clock signal (line 125) are also 3.125 MHz signals. However, the frequency of the synchronizing clock signal on line 126 could be much less than 3.125 MHz. For example, the preferred embodiment uses a synchronizing clock frequency of $$\frac{3.125 \text{ MHz}}{4} = 781.25 \text{ kHz}.$$

Figure 4:
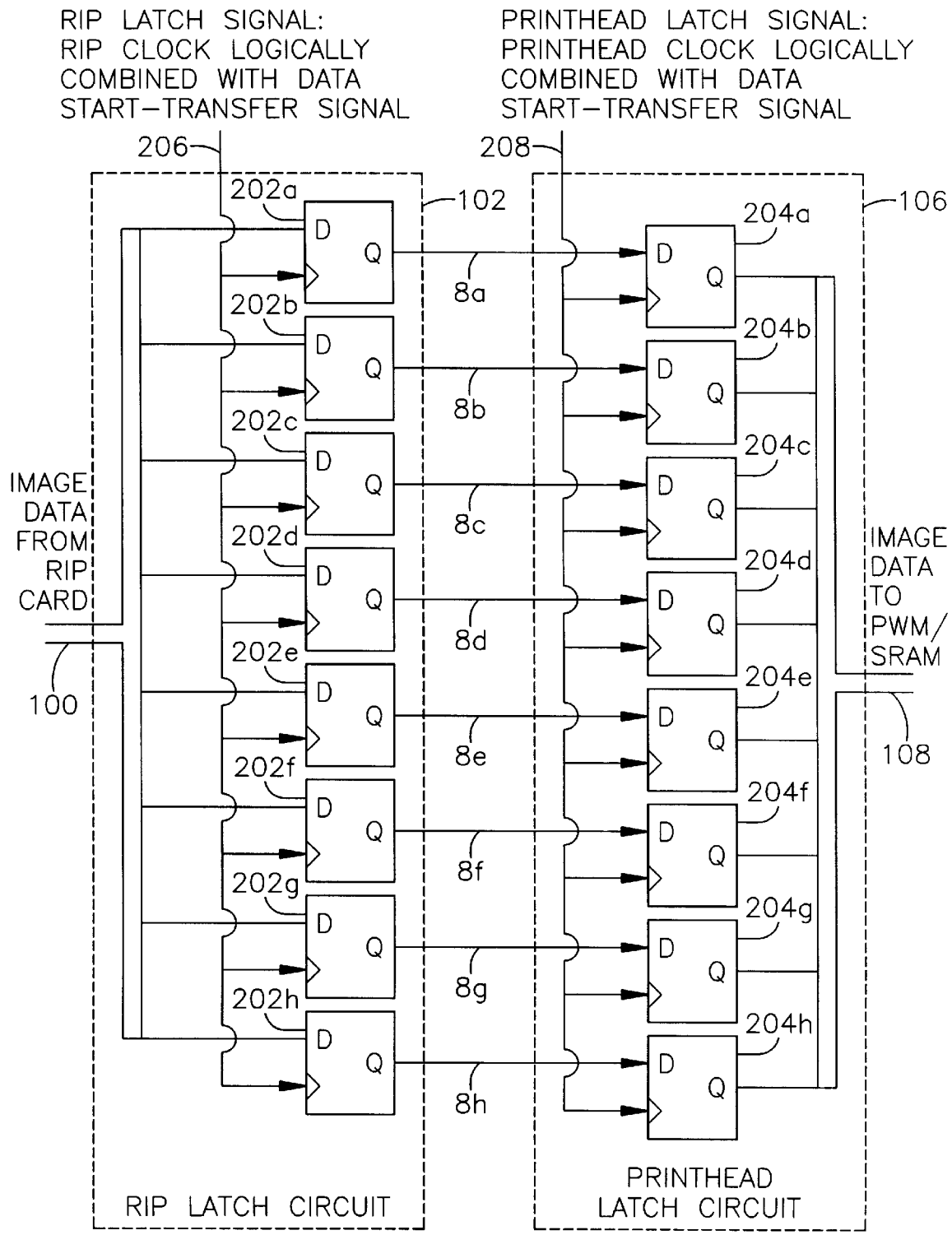
FIG. 4 is a schematic diagram of a preferred embodiment of video data latching circuits included in the video drive circuit.

Shown in FIG. 4 is a preferred embodiment of the RIP latch circuit 102 and the printhead latch circuit 106. The RIP latch circuit 102 includes eight parallel D flip-flops 202*a–h*, one flip-flop for each LF video signal channel. The image data from the RIP card 4 is distributed to each of the eight flip-flops 202*a–h* via the line 100. The line 206 carries a RIP latch signal, which is a logical combination of two signals: the multiplied version of the synchronizing clock signal from the RIP PLL 128, and the start-transfer signal coming over from the printhead IC 10 on the line 132. The RIP latch signal on the line 206 is used to latch out the appropriate number of image data bits on each of the LF video signal lines 8*a*–8*h*.

The printhead latch circuit 106 of the preferred embodiment also includes eight parallel D flip-flops 204*a–h* corresponding to the eight LF video signals. As shown in FIG. 4, each of the LF video signal lines 8*a–h* is connected to the data input of a corresponding flip-flop 204*a–h*. The line 208 carries a printhead latch signal, which is a logical combination of two signals: the sampling clock signal on the line 125, and the start-transfer signal on the line 132. The line 208 is connected to the clock input of each flip-flop 204*a–h*. As mentioned previously, the sampling clock signal and the multiplied version of the synchronizing clock signal are phase aligned. Thus, the RIP latch signal on the line 206 and the printhead latch signal on the line 208 are also phase aligned to provide for the proper sequencing of the data latched out of the RIP latch circuit 102 and into the printhead latch circuit 106.

FIG. 5 shows a typical timing diagram corresponding to the signals described above. In this example, both the synchronizing clock signal (line 126) and the multiplied version of the synchronizing clock signal (line 129) are free running. When the start-transfer signal (line 132) goes low, the RIP latch signal (line 206) begins to follow the transitions of the multiplied version of the synchronizing clock (line 129). As a result, LF video data is latched out onto the LF video signal lines 8*a–h*. As FIG. 5 indicates, the state transitions of the printhead latch signal (line 208) are aligned with the state transitions of the RIP latch signal (line 206). The reconstructed HF video data stream (line 108) is also represented in FIG. 5.

While specific embodiments of the invention have been described with particularity above, it will be appreciated that the invention is equally applicable to other adaptations. For example, the invention is not limited to using eight LF video signals. Any plural number of LF video signals carried on a corresponding number of conductors in the LF cable 8, and a corresponding number of flip-flops in the latch circuits (102 and 106) may be used. Further, it will be appreciated that the invention is not limited to using a raster image processor to generate the image data. The disclosed architecture is equally applicable to other types of image processors and data formats. Also, one skilled in the art will appreciate that the raster image processor 4 and the engine card 28 may be combined to provide any combination of function.

What is claimed is:

1. An electrophotographic image forming apparatus for transferring image information and forming an image on a medium while producing electromagnetic interference below a desired level, the apparatus comprising:

an image processor for receiving a high-frequency image information signal containing the image information and having a high frequency, the image processor further for forming a plurality of low-frequency image information signals based upon the high-frequency image information signal, each low-frequency image information signal having a low frequency which is substantially less than the high frequency;

a low-frequency interface connected to the image processor for transferring the low-frequency image information signals while producing electromagnetic interference below the desired level;

a control circuit connected to the low-frequency interface for receiving the low-frequency image information signals from the low-frequency interface, and for combining the low-frequency image information signals to form at least one reconstructed high-frequency image information signal therefrom, the reconstructed high-frequency image information signal having substantially the same high frequency and containing the same image information as the high-frequency image information signal received by the image processor;

a high-frequency interface connected to the control circuit for transferring the reconstructed high-frequency image information signal while producing electromagnetic interference below the desired level; and an image formation device connected to the high-frequency interface for forming an image on the medium based on the image information contained within the reconstructed high-frequency image information signal.

2. The apparatus of claim 1 wherein the low-frequency interface comprises a parallel interface.

3. The apparatus of claim 1 wherein the image processor generates an integer number of low-frequency image information signals, the low frequency being a quotient of the high frequency divided by an integer value representing the integer number of low-frequency image information signals.

4. The apparatus of claim 3 wherein the integer number of low-frequency image information signals is eight.

5. The apparatus of claim 1 wherein the high frequency is reduced by compressing the image information using a run length encoding technique.

6. The apparatus of claim 1 wherein the low-frequency interface comprises an electrical cable having at least as many conductors as there are low-frequency image information signals, each low-frequency image information signal being transferred across a corresponding conductor of the electrical cable.

7. The apparatus of claim 1 further comprising:

an analog laser diode driver for receiving the reconstructed high-frequency image information signal from the high-frequency interface and for driving the image formation device based thereon, wherein the image formation device further comprises a laser diode.

8. The apparatus of claim 1 wherein:

the control circuit further comprises a control circuit phase-lock-loop electrically connected to the image processor, the control circuit phase-lock-loop for generating a synchronizing clock signal and transferring the synchronizing clock signal to the image processor; and the image processor receives the synchronizing clock signal and uses the synchronizing clock signal in generating the low-frequency image information signals.

9. The apparatus of claim 1 wherein:

the control circuit further comprises a control circuit phase-lock-loop for generating a clock signal, and a divider connected to the control circuit phase-lock-loop and the image processor, the divider for receiving the clock signal and generating a synchronizing signal based on the clock signal; and the image processor further comprises an image processor phase-lock-loop for receiving the synchronizing signal and using the synchronizing signal in generating the low-frequency image information signals.

10. The apparatus of claim 1 wherein the image processor encodes the image information in the low-frequency image information signals using multiple voltage levels.

11. The apparatus of claim 1 wherein:

the image processor includes a first latch circuit for shifting out the image information into the low-frequency image information signals; and the control circuit includes a second latch circuit for sampling the low-frequency image information signals and recombining the image information in the low-frequency image information signals to form the reconstructed high-frequency image information signal.

12. A video drive circuit for transferring image information in an electrophotographic image forming device, the image information related to an image to be formed on a medium, the circuit comprising:

a raster image processor for receiving a high-frequency data signal containing the image information and having a high frequency, the raster image processor further for forming an integer number of low-frequency data signals based upon the high-frequency data signal, each low-frequency data signal having a low frequency which is substantially less than the high frequency;

a parallel interface cable connected to the raster image processor for transferring the low-frequency data signals, the parallel interface cable having at least as many conductors as there are low-frequency data signals, each low-frequency data signal being transferred across a corresponding conductor of the parallel interface cable; and a laser printhead comprising:

a printhead control circuit connected to the parallel interface cable for receiving the low-frequency data signals from the parallel interface cable, and for combining the low-frequency data signals to form at least one reconstructed high-frequency data signal therefrom, the reconstructed high-frequency data signal having substantially the same high frequency and containing the same image information as the high-frequency data signal received by the raster image processor, the low frequency being a quotient of the high frequency divided by an integer value representing the integer number of low-frequency data signals;

a high-frequency interface connected to the printhead control circuit for transferring the reconstructed high-frequency data signal;

an analog laser diode driver for receiving the reconstructed high-frequency data signal and for driving a laser diode based thereon; and the laser diode connected to the analog laser diode driver, the laser diode for forming an image on the print medium based on the image information contained within the reconstructed high-frequency data signal.

13. The video drive circuit of claim 12 wherein the integer number of low-frequency data signals is eight.

14. The video drive circuit of claim 12 wherein the high frequency is reduced by compressing the image information using a run length encoding technique.

15. A laser printer for forming images on a print medium, the laser printer having desired low levels of electromagnetic emissions, the laser printer comprising:

a raster image processor for receiving a high-frequency image information signal containing the image information and having a high frequency, the raster image processor further for forming a plurality of low-frequency video signals based on the high-frequency image information signal that jointly carry image information relating to an image to be formed on the print medium, each low-frequency video signal having a low-frequency which is substantially less than the high frequency;

a low-frequency interface connected to the raster image processor for transferring the low-frequency video signals;

a printhead control circuit connected to the low-frequency interface for receiving the low-frequency video signals generated by the raster image processor, and for combining the low-frequency video signals to form at least one reconstructed high-frequency video signal that has substantially the same high frequency and carries the same image information as the high-frequency image information signal received by the raster image processor;

a high-frequency interface connected to the printhead control circuit for transferring the reconstructed high-frequency video signal; and a laser device connected to the high-frequency interface, the laser device causing a toner material to transfer an image to the print medium based on the image information contained within the reconstructed high-frequency video signal.

16. The laser printer of claim 15 wherein:

the printhead control circuit further comprises a printhead control circuit phase-lock-loop electrically connected to the raster image processor, the printhead control circuit phase-lock-loop for generating a synchronizing clock signal and transferring the synchronizing clock signal to the raster image processor; and the raster image processor receives the synchronizing clock signal and uses the synchronizing clock signal in generating the low-frequency video signals.

17. The laser printer of claim 15 wherein:

the printhead control circuit further comprises a printhead control circuit phase-lock-loop for generating a clock signal, and a divider connected to the printhead control circuit phase-lock-loop and the raster image processor, the divider for receiving the clock signal and generating a synchronizing signal based on the clock signal; and the raster image processor further comprises a raster image processor phase-lock-loop for receiving the synchronizing signal and using the synchronizing signal in generating the low-frequency video signals.

18. The laser printer of claim 15 wherein the raster image processor encodes the image information in the low-frequency video signals using multiple voltage levels.

19. The laser printer of claim 15 wherein the low-frequency interface comprises a parallel interface.

20. The laser printer of claim 15 wherein the raster image processor generates an integer number of the low-frequency video signal, the low frequency being a quotient of the high frequency divided by an integer value representing the integer number of low-frequency video signals.

21. The laser printer of claim 20 wherein the integer number of low-frequency video signals is eight.

22. The laser printer of claim 15 wherein the high frequency is reduced by compressing the image information using a run length encoding technique.

23. The laser printer of claim 15 wherein the image processor generates a number of low-frequency video signals, and the low-frequency interface comprises an electrical cable having at least as many conductors as there are low-frequency video signals, each low-frequency video signal being transferred across a conductor of the electrical cable.

24. The laser printer of claim 15 wherein the laser device further comprises a laser diode.

25. A method for processing image information in a printer while producing electromagnetic interference below a desired level, the method comprising:

generating a first high-frequency image information signal containing the image information and having a high frequency;

forming a plurality of low-frequency image information signals based upon the first high-frequency image information signal, each low-frequency image information signal having a low frequency which is substantially less than the high frequency;

transferring to a destination the low-frequency image information signals while producing electromagnetic interference below the desired level;

receiving the low-frequency image information signals at the destination;

combining the low-frequency image information signals to form at least one reconstructed high-frequency image information signal therefrom, the reconstructed high-frequency image information signal having substantially the same high frequency and containing the same image information as contained in the first high-frequency image information signal;

transferring the reconstructed high-frequency image information signal to an image formation device while producing electromagnetic interference below the desired level; and forming an image on a print medium based on the image information contained within the reconstructed high-frequency image information signal.

* * * * *